US009985933B2

(12) United States Patent
Ghafourifar

(10) Patent No.: US 9,985,933 B2
(45) Date of Patent: May 29, 2018

(54) SYSTEM AND METHOD OF SENDING AND RECEIVING SECRET MESSAGE CONTENT OVER A NETWORK

(71) Applicant: Entefy Inc., Palo Alto, CA (US)

(72) Inventor: Alston Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 303 days.

(21) Appl. No.: 14/985,874

(22) Filed: Dec. 31, 2015

(65) Prior Publication Data

US 2016/0191472 A1    Jun. 30, 2016

Related U.S. Application Data

(63) Continuation-in-part of application No. 14/584,329, filed on Dec. 29, 2014.

(51) Int. Cl.
*H04L 29/06* (2006.01)
*G06F 21/62* (2013.01)
(Continued)

(52) U.S. Cl.
CPC ........ *H04L 63/0428* (2013.01); *G06F 21/606* (2013.01); *G06F 21/6209* (2013.01); *G06F 21/6254* (2013.01); *H04L 9/088* (2013.01); *H04L 9/0866* (2013.01); *H04L 2209/60* (2013.01)

(58) Field of Classification Search
CPC ............... H04L 63/0428; H04L 9/0866; G06F 21/6254; G06F 21/606
See application file for complete search history.

(56) References Cited

U.S. PATENT DOCUMENTS 8,799,022 B1*  8/2014  O'Brien ................. G06Q 10/10
                                                              705/2
9,590,949 B2*  3/2017  Murphy .............. H04L 63/0428
(Continued)

OTHER PUBLICATIONS

Goyal, et al., "Attribute-Based Encryption for Fine-Grained Access Control of Encrypted Data," '06, Oct. 30-Nov. 3, 2006, Alexandria, Virginia, USA.

*Primary Examiner* — Wasika Nipa
(74) *Attorney, Agent, or Firm* — Blank Rome LLP

(57) ABSTRACT

The proliferation of personal computing devices in recent years, especially mobile personal computing devices, has led to increased concerns regarding the safety and security of documents and messages that are sent over networks. Users desire a system that provides for the setting of custom, content-agnostic, permissions at a message, document, and/or sub-document-level through communications networks. Such a system may allow users to apply customized privacy settings and encryption keys differently to particular parts of documents and/or messages. Such a system may also allow the user to manipulate outgoing message objects of pre-existing formats, so as to "hide" the encrypted document and/or message content within one or more portions of the message object that are not displayed in existing message viewer applications, e.g., metadata fields or unused headers. As such, only authorized message viewing applications may know where to look for (and have the necessary keys to decrypt) such hidden content.

20 Claims, 12 Drawing Sheets

(51) Int. Cl.
*H04L 9/08* (2006.01)
*G06F 21/60* (2013.01)

(56) References Cited

U.S. PATENT DOCUMENTS

| | | | |
|---|---|---|---|
| 9,749,321 B2 * | 8/2017 | Farnsworth | ............. H04L 51/28 |
| 2001/0055396 A1 | 12/2001 | Jevans | |
| 2002/0078361 A1 * | 6/2002 | Giroux | ................ H04L 63/0428 |
| | | | 713/183 |
| 2003/0105719 A1 * | 6/2003 | Berger | ................ G06F 21/6245 |
| | | | 705/51 |
| 2006/0017747 A1 | 1/2006 | Dawson | |
| 2008/0140578 A1 * | 6/2008 | Felt | .................... G06Q 20/3829 |
| | | | 705/71 |

* cited by examiner

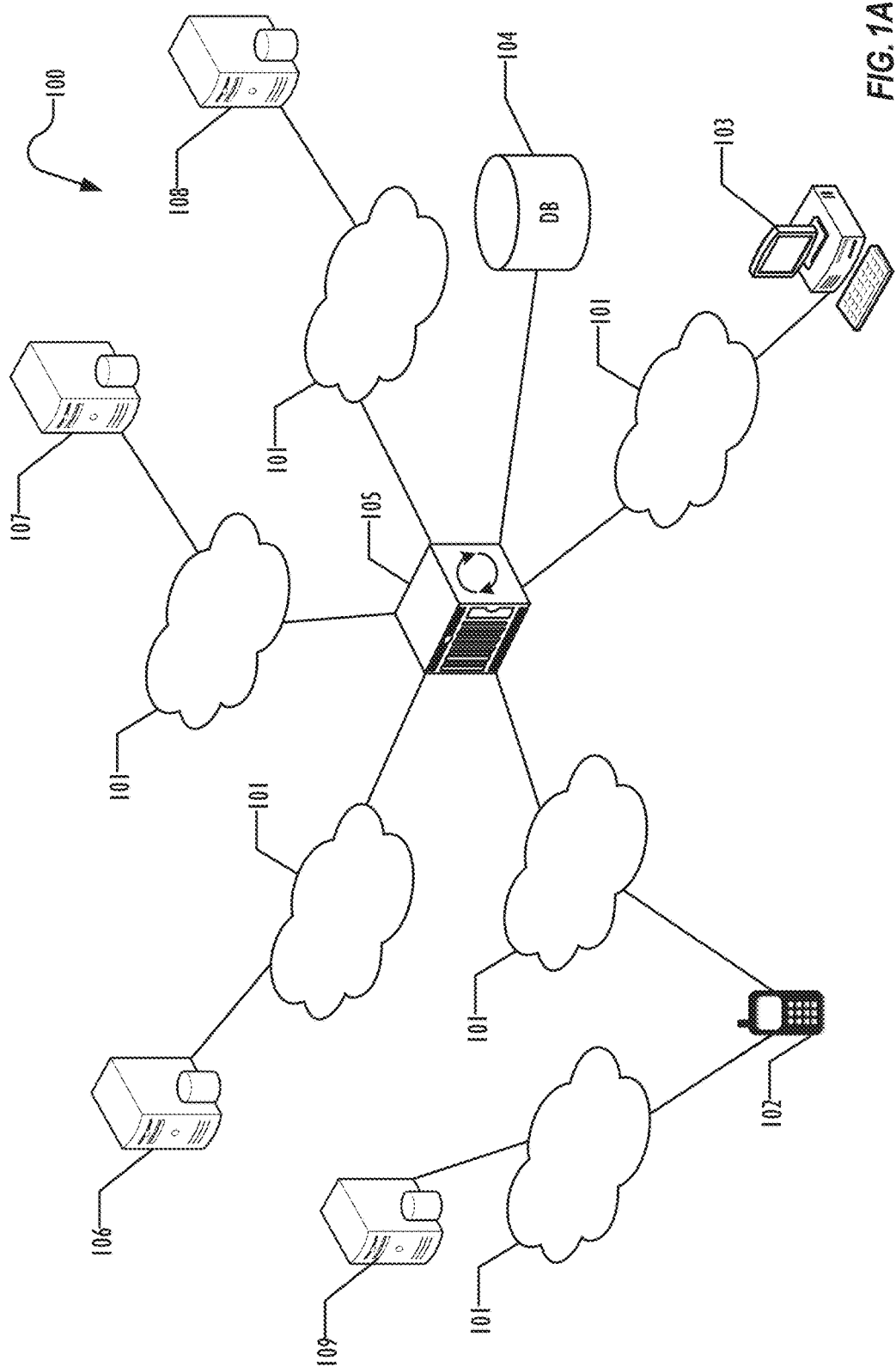

SYSTEM AND METHOD OF SENDING AND RECEIVING SECRET MESSAGE CONTENT OVER A NETWORK

CROSS-REFERENCE TO RELATED APPLICATIONS

This application claims priority to, and is a continuation-in-part of, U.S. patent application Ser. No. 14/584,329, filed Dec. 29, 2014, entitled "System And Method of Determining User-Defined Permissions Through A Network" ("the '329 application"). The '329 application is hereby incorporated by reference in its entirety.

TECHNICAL FIELD

This disclosure relates generally to systems, methods, and computer readable media for determining user-defined, content-agnostic document and message access permission through a network and for sending such documents and messages in a "secret," e.g., hidden and/or encrypted, fashion over a network.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to increased concerns regarding the safety and security of documents and messages that are sent over networks. Users desire a system that provides for the setting of custom, e.g., user-defined, content-agnostic permissions at a message-, document-, and/or sub-document—(i.e., a part of the document that comprises less than the entire document) level through a communications network. Such a system would allow customized privacy settings to be specified at various levels of social distance from the user sending the document or message (e.g., public, private, followers, groups, Level-1 contacts, Level-2 contacts, Level-3 contacts, etc.). Such a system may also allow the user to apply customized privacy settings and encryption keys differently to particular parts of a document, e.g., making a first part of a document available only to a first class of users and other parts of the document available to the first class of users and a second class of users.

Thus, a system for providing Adaptive Privacy Controls (APC) is described herein. APC comprises a user-controllable or system-generated, intelligent privacy system that can limit viewing, editing, and re-sharing privileges for files and other digital objects of all types stored in a compatible system (e.g., message objects, user profile fields, documents, etc.). APC allows users to share whatever information they want with whomever they want, while keeping others from accessing such information via assorted rights management techniques and/or encryption processes that can be initiated by user command or via system intelligence on entire objects or portions of objects. APC techniques may be applied to individuals, pre-defined groups, and/or ad-hoc groups. Customized encryption keys may further be applied to particular parties or groups of parties to enhance the security of the access permission settings.

APC may also be used to apply privacy settings to only particular parts of a document. For example, User A in an organization may need to see the entire content of the organization's annual report drafts, but other users in the organization may only need to see a version that has sensitive financial/pro-forma data redacted. For example, pages 1-20 of the annual report would be available to User A, but only pages 1-19 would be available to the other users.

Thus, according to some embodiments, the network-based, user-defined, content-agnostic (i.e., agnostic as to both format and subject matter) document and message access permission setting systems, methods, and computer readable media described herein may provide a seamless, intuitive user interface (e.g., using touch gestures or mouse input) allowing a user to block out particular areas of interest in a document or message from particular recipients or groups of recipients, as well as to specify privacy and access permission settings for a single document or message—or across all documents owned by the user.

According to other embodiments, the document and message access permission setting systems, methods, and computer readable media described herein may also provide an interface allowing a user to manipulate an outgoing message object, so as to "hide" the "secret" message content that has had the aforementioned specific permissions applied to it (e.g., encrypted content) within one or more portions of the message object that are not displayed in existing message viewer applications, such as hidden metadata fields or unused headers. This interface allows the "secret," i.e., hidden (and/or encrypted) content to be delivered using existing message formats (e.g., Multipurpose Internet Mail Extensions, or "MIME") and delivery protocols (e.g., Simple Mail Transfer Protocol, or "SMTP") and to be viewed using existing message viewers (e.g., webmail clients)—while still protecting (and hiding) the actual secret content from the recipient. Using these techniques, no recipient (even an intended recipient) would be able to view the actual content of the message object using the existing message viewer application.

According to such systems, methods, and computer readable media, only an authorized message viewing application would have both the instructions and knowledge of where in the message to look for the secret hidden content, as well as the necessary decryption keys to decrypt the hidden content. As such, the "hidden and encrypted" message object may be stored, archived, exported, etc. using the infrastructure of an existing communication channel (e.g., a webmail provider's servers) and may even be forwarded to other users, while still respecting the sender's original intent that only the intended recipients be able to view the message's secret content, i.e., by using an authorized message viewing application.

Moreover, the 'message body' field of the message object may be intentionally 'blanked' out and/or filled with auto-generated obfuscation text, such that, when viewed outside an authorized client message viewing application (e.g., in an existing message viewer) or when viewed by an unintended recipient, there is either no indication that any real content is even present in the message (i.e., if no information has been stored in the 'message body' field, that is, it has been 'blanked' out), or the content that is displayed in the existing message viewer is intentionally obfuscating text (i.e., text that has nothing to do with the actual content of the message, but that would not 'tip off' an unintended recipient that there was any 'true' content that s/he was not seeing in the message). In other embodiments, the system may generate one or more obfuscation media objects (e.g., images, video, audio, etc.) to include in the 'message body' field of the message object, rather than obfuscation text.

The subject matter of the present disclosure is directed to overcoming, or at least reducing the effects of, one or more of the problems set forth above. To address these and other issues, techniques that enable the setting of user-defined, content-agnostic permissions at a message-, document-, and/or sub-document-level through a communications network, as well as techniques to 'hide' encrypted content within existing message objects' data structures such that the true content is only viewable within authorized message viewing applications, are described herein.

BRIEF DESCRIPTION OF THE DRAWINGS

FIG. 1A is a block diagram illustrating a server-entry point network architecture infrastructure, according to one or more disclosed embodiments.

DETAILED DESCRIPTION

Figure 1B:
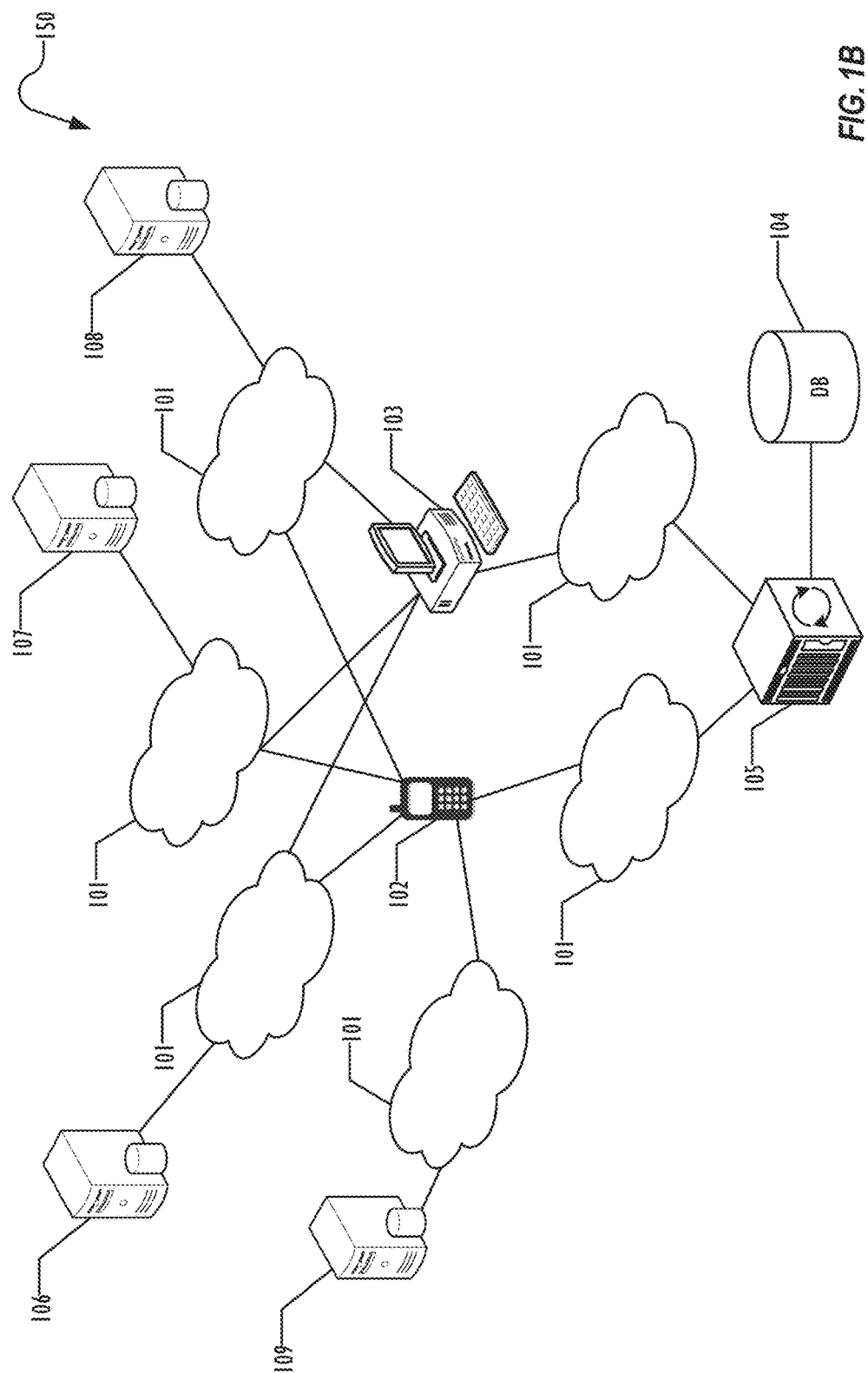
FIG. 1B is a block diagram illustrating a client-entry point network architecture infrastructure, according to one or more disclosed embodiments.

Disclosed are systems, methods, and computer readable media for creating user-defined, content-agnostic, custom privacy settings for documents, sub-documents, and messages that limit sharing privileges for files of all formats. More particularly, but not by way of limitation, this disclosure relates to systems, methods, and computer readable media to permit users of the access permission setting system to combine customized access permission settings at the document and sub-document levels with customized encryption keys to achieve a greater level of control over who their data is shared with and exactly what information is shared. Also disclosed herein are systems, methods, and computer readable media for allowing a user to manipulate an outgoing message object, so as to "hide" encrypted message content within one or more portions of an existing message object data structure that are not displayed in existing message viewer applications. This interface allows the actual hidden (and/or encrypted), i.e., "secret," content to be delivered using existing message formats and delivery protocols and to be viewed (and even forwarded) using existing message viewers (e.g., webmail clients)—while still protecting (and hiding) the actual content from the recipient—unless the recipient is an intended recipient and is viewing the message object within an authorized message viewing application.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multi-format communication composition and inbox feed system to be described herein. In the server-entry point network architecture infrastructure 100 of FIG. 1A, centralized sync server 105 may be responsible for querying and obtaining all the messages from the various communication sources for individual users of the system and keeping the multi-protocol, multi-format inbox feed for a particular user of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE® or YAHOO! ® email server). (GOOGLE is a registered service mark of Google Inc. YAHOO! is a registered service mark of Yahoo! Inc.) Third party email server 106 may be periodically pinged by sync server 105 to determine whether particular users of the multi-protocol, multi-format communication composition and inbox feed system described herein have received any new email messages via the particular third-party email services. Server 107 represents a third party instant message server (e.g., a YAHOO! ® Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' or 'on-system' users are communicating with one another via the multi-protocol, multi-format communication system itself, such communications may occur entirely via sync server 105, and third party servers 106-109 may not need to be contacted.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
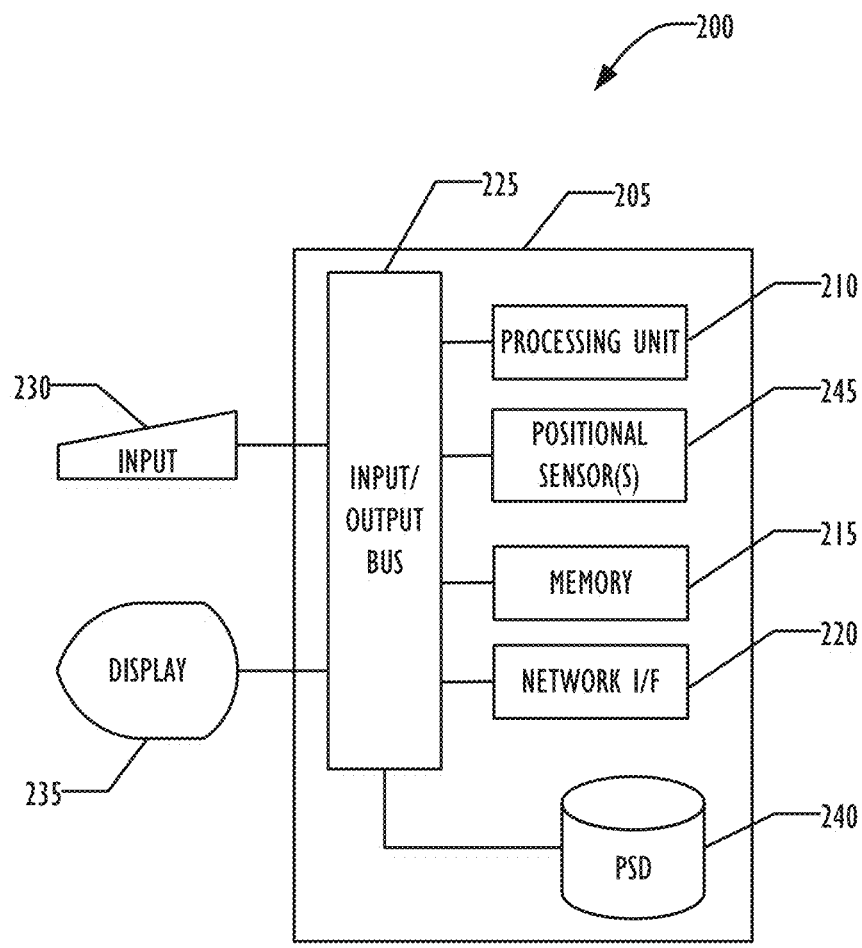
FIG. 2A is a block diagram illustrating a computer which could be used to execute the cloud-based user-defined access permission setting approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
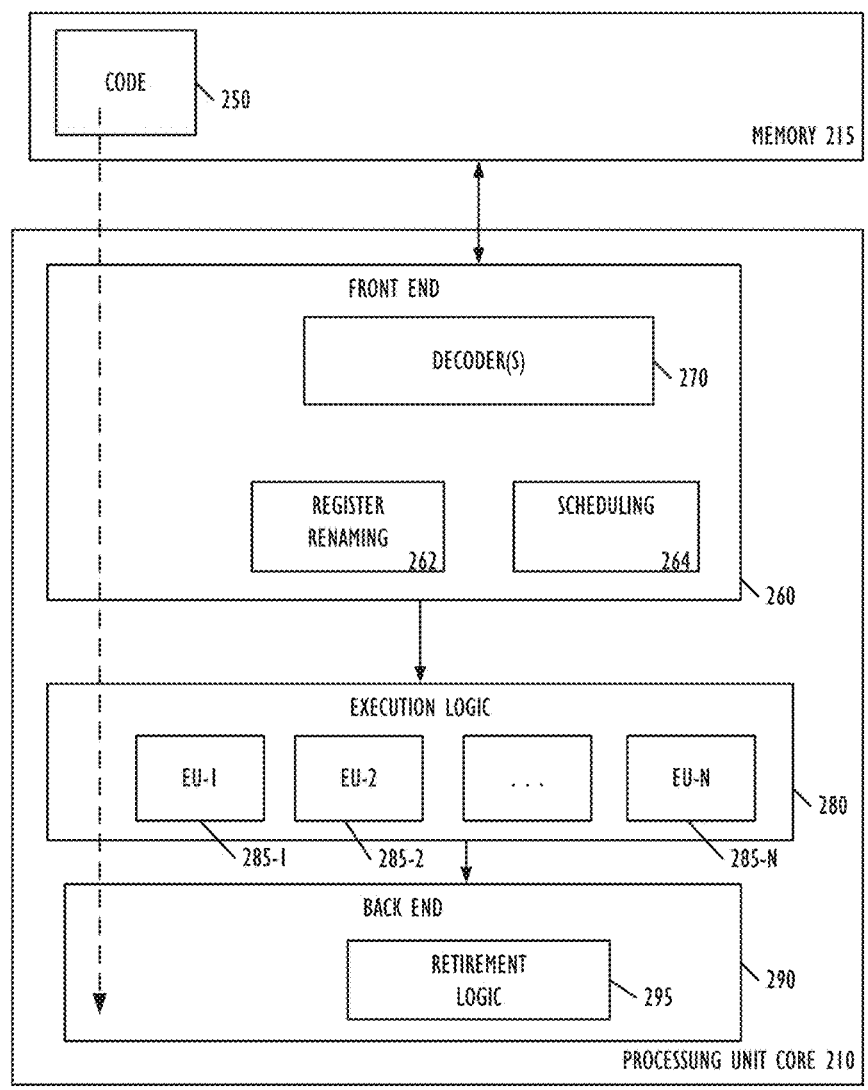
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Document and Sub-Document Level Access Permission Setting Scheme with Custom, Recipient-Based Privacy Settings According to some embodiments of a system for providing Adaptive Privacy Controls (APC), global, i.e., document-level or file-level access permission setting may be implemented. For example, in one scenario, a user may wish to share a document with a colleague, but not allow that colleague to pass along the document to other parties. In such a scenario, User A may use the system to send the file (e.g. using SMTP, XMPP, etc.) to the colleague, User B, while selecting the appropriate APC option(s) to limit User B's re-sharing ability. The client application or server (depending on system architecture) may then process the selected APC option(s) and protect the document with a shared password, public/private key encryption, token-controlled link, or other form of protection. User B can then receive a typical message with the attached file, held in a protected container, which requires a password (in the case of an off-system user) or private key (in the case of an on-system user). User B may also receive a typical message with a link to a token/access-controlled document for view only, download, live editing, or other such activity—each individually permissioned at User A's discretion.

If User B is an 'on-system' recipient, the system may process the shared file, use the recipient's public key to encrypt the file, and send it to the recipient in any desired format, using any desired protocol. When the recipient opens the message and attachment in a compatible application, the private key will automatically decrypt the file and open it for use. To protect against re-sharing, the system may make the file read-only (i.e., no download permissions). Any attempt on User B's part to digitally transmit the file or portions of the file to other recipients will result in the recipient receiving unusable, encrypted content.

If, instead, User B is an 'off-system' recipient, the system may process the shared file and perform any of the following actions: 1) generate a protected .zip file (or other similar container) with a password that User A may share with User B via any preferred communication protocol; 2) generate a link to a web portal that requires User B to join the system and authenticate himself or herself prior to receiving the document (e.g., by matching email address identifiers and performing standard validation processes to ensure identity).

According to other embodiments of a system for providing Adaptive Privacy Controls (APC), local, i.e., sub-document-level or sub-file-level access permission setting may be implemented. For example, a user may wish to share sensitive financial information contained in an Annual Report among a team. In such a scenario, User A may decide to share the Annual Report with his team, comprising User B and User C. In this scenario, User B has permission to see all of the Annual Report, but User C only has permission to view the summary worksheet on page 1 of the Annual Report. In such a scenario, APC would allow User A to share a fully-viewable document with User B and a partially-viewable version of the same document with User C. Prior to sending the file, User A could instruct the system to protect the sensitive data in the document using markup-specific substitutions.

Another exemplary situation wherein sub-document-level access permission setting may be employed is in the sharing of picture or video media, whereby specific sections of the media content require selective censorship, redaction, or other protection for certain recipients, in order to maintain desired privacy or security levels. In one scenario, User A, the sharer, may want to share a humorous picture with his wife (User B) and young son (User C). Knowing that the picture contains certain explicit words or imagery but is still funny even without the explicit sub-portions of the content, User A may attach the photo to a message in a capable application and use the application's selection capabilities to "block-out" the explicit sub-portions of the image. User A may then instruct the system to allow User B to view the full uncensored image, while only allowing User C to view the censored portions of the image.

For both of the exemplary sub-document access permission setting scenarios described above, the application can present a view of the object in question (e.g., via a compatible file viewer or image thumbnail, etc.) to the sender of the object. The sender can then use any desired form of selection input (e.g., touch gestures, mouse gestures, etc.) to indicate which content should be access-controlled. Those selections will be recorded and either processed locally or sent to a central server (depending on client capabilities), whereby the system will process the object's original source code (e.g. in XML format, MIME format, etc.), corresponding to the section or sections matching the user selection.

The section(s) in question may then be isolated (maintaining suitable markup) and replaced with a link reference or encrypted text (using any one of standard encryption practices, such as shared secrets, public/private key, etc.). The resulting "APC-enabled" object, when viewed in an authorized application, may prompt the application to attempt to contact a server to retrieve the markup text or (if encrypted) attempt to decrypt with the private key stored in the authorized application. Unsuccessful retrieval or decryption will result in the recipient only viewing "part" of the original file. Because this service requires knowledge of the markup structure of any compatible file type, all APC changes will be made while keeping the overall markup structure complete, such that the application may be opened (i.e., APC changes will not be implemented merely by removing sections of potentially important markup and thus corrupting the file).

Figure 3:
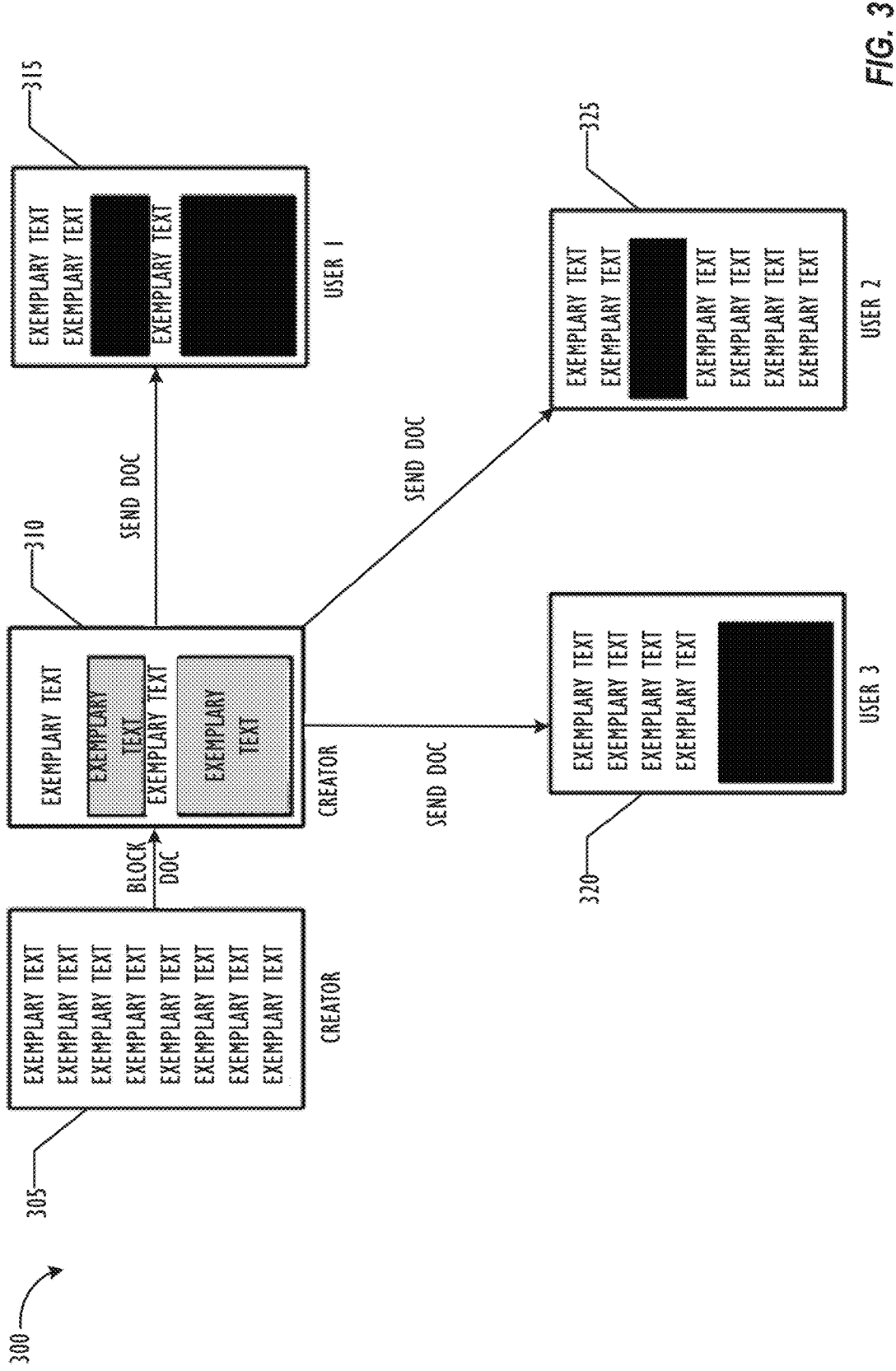
FIG. 3 shows an example of sub-document-level access permission setting scheme with custom recipient-based privacy settings, according to one or more disclosed embodiments.

FIG. 3 shows an example of sub-document-level access permission setting scheme 300 with custom recipient-based privacy settings, according to one or more disclosed embodiments. As demonstrated in the exemplary access permission setting scheme 300, the creator of the document 305, "Creator," creates or edits the document 305 that is to have custom access permission settings applied to it. Next, the Creator may identify particular portions of the document 305 to block out from the view of certain recipients, represented by the grayed out squares over particular portions of the document 305 as shown in element 310 in FIG. 3.

Finally, the Creator may choose to send the document 305 to three separate users (either simultaneously or at different times), with the appropriate portions blocked out for the appropriate recipients, based on, e.g., their identity, status as a member of a particular group, or their status as a follower of the Creator, etc. For example, as is shown in FIG. 3, the version of the document 305 sent to "User 1" 315 has both of the identified portions blocked out from the view of User 1. By contrast, the version of the document sent to "User 2" 320 has only the bottom portion of the two identified portions blocked out from the view of User 2, and the version of the document sent to "User 3" 325 has only the top portion of the two identified portions blocked out from the view of User 3. Such a system allows a single version of the document 305 to be stored in a central database or server, while still allowing the document to be shared to multiple recipients, with each recipient able to view only particular sub-portions of the document, based on the access permission settings specified by the creator/sender of the document and/or the identity of the particular recipient.

APC System Access Permission Settings Options

Several examples of potential APC system access permission settings that may be applied to particular documents or messages are shown and described below:

Public: Visible to the world. Searchable by search engines. Auto-broadcasted to the creator's "Followers." The "followers" of a particular user may be established by the followers that have been created within the APC document access permission setting system itself (if the recipients are users of such a system), or may be pulled in from third-party services, such as Facebook, Twitter, LinkedIn, etc.

Followers: Notifies and is visible to all followers of the creator.

Just Me: Private setting. Viewable only by user that creates the document or message.

My Contacts: All contacts available on user's contact list. The "contacts" of a particular user may be established by the contacts that have been created within the APC document access permission setting system itself, or may be pulled in from third-party services or applications, such as Gmail, Yahoo! Mail, Outlook, etc.

Level 1 Contacts: All registered-user contacts who have directly connected with the creator via the APC document access permission setting system itself, e.g., by accepting an invitation from the creator to become a contact. This access permission setting may be thought of as being bi-directional, e.g.: 1.) User A invites User B, and User B accepts; 2.) User B invites User A, and User A accepts. In some embodiments, all "Level 1" contacts of a user may be automatically added to that user's "My Contacts" list.

Level 2 Contacts: Direct contacts of the user's Level 1 contacts.

Level 3 Contacts: Direct contacts of user's Level 2 contacts.

Groups: Users may create one or multiple custom groups for use with the APC document access permission setting system.

Custom: Users may manually add contacts, e.g., using an email address or name. The APC document access permission setting system may then auto-suggest users based on name entry (if the name is present in the user's "My Contacts" list). Documents that have a custom access permission setting system associated with them will then only be viewable by the particular users whose information is added to the custom authorization list for the document.

As will be understood, the settings levels described above are merely exemplary, and other ways of specifying access permission setting schemes may be used in particular implementations of an APC document access permission setting system.

Figure 4:
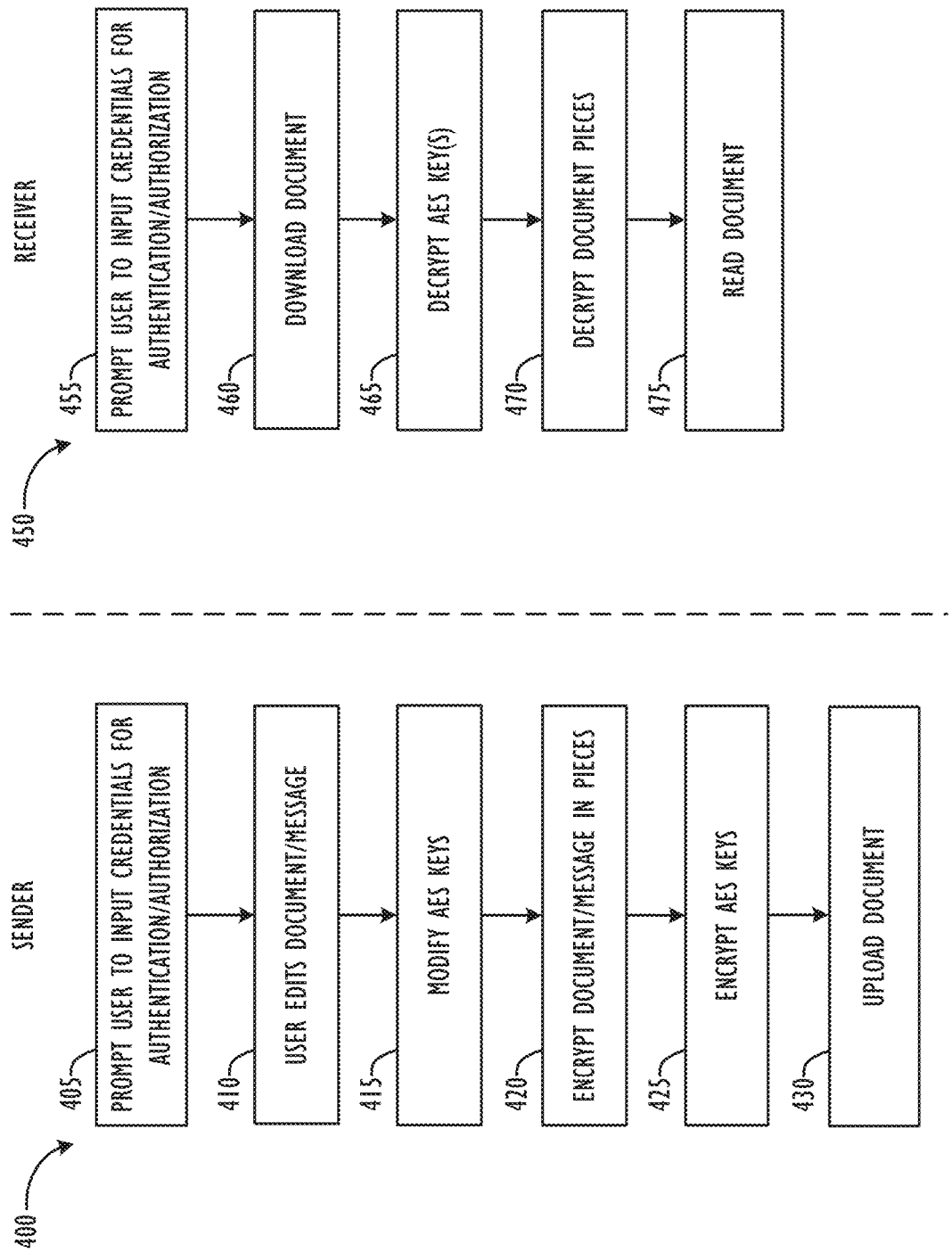
FIG. 4 is a pair of flowcharts showing a method for utilizing APC process from both the sender and receiver perspective, according to one or more disclosed embodiments.

FIG. 4 is a pair of flowcharts 400 and 450 showing a method for utilizing the APC process from both the sender's and receiver's perspective, according to one or more disclosed embodiments. Beginning with flowchart 400 from the sender's perspective, first, the system prompts the sender to input his or her credentials for authentication (Step 405). Next, the sender opens the document and edits the document, e.g., by highlighting a portion of the document and selecting particular recipients or groups of recipients to share access to that portion of the document with (Step 410). When finished, the sender may save the changes to the document. Next, the system modifies Advanced Encryption Standard (AES) encryption keys for each portion of the document with different permissions settings (Step 415). The AES is a specification for the encryption of electronic data established by the U.S. National Institute of Standards and Technology (NIST) in 2001. Each portion of the document with different permissions settings may then be encrypted with a different AES key (Step 420). Each AES key may then be encrypted with the recipient's public key (Step 425). Finally, the sender uploads the document to the system for transmission over the network to the desired recipients in the desired format(s) (Step 430).

Attention is now directed to flowchart 450, which shows the process from the receiver's perspective. First, the system prompts the receiver to input his or her credentials for authentication (Step 455). Next, the receiver downloads the document or message that was sent to him or her (Step 460). Next, the receiver's client device decrypts the AES keys that he is able to with his private key (Step 465). Next, the receiver uses the AES keys he obtained to decrypt the pieces of the document that he is able to (Step 470). Finally, the receiver opens the document for reading and/or writing, but can only see the portions that he or she has access to (Step 475). The remaining portions of the document remain scrambled to the receiver.

It is to be understood that, although AES encryption is discussed here, any suitable form of encryption may be utilized to encrypt the documents and/or portions of the documents. Further, any suitable key size, e.g., 128, 192, or 256 bits, may be used, based on a particular implementation of the APC system.

Customized Privacy and Access Permission Setting Using Encryption Keys

Figure 5:
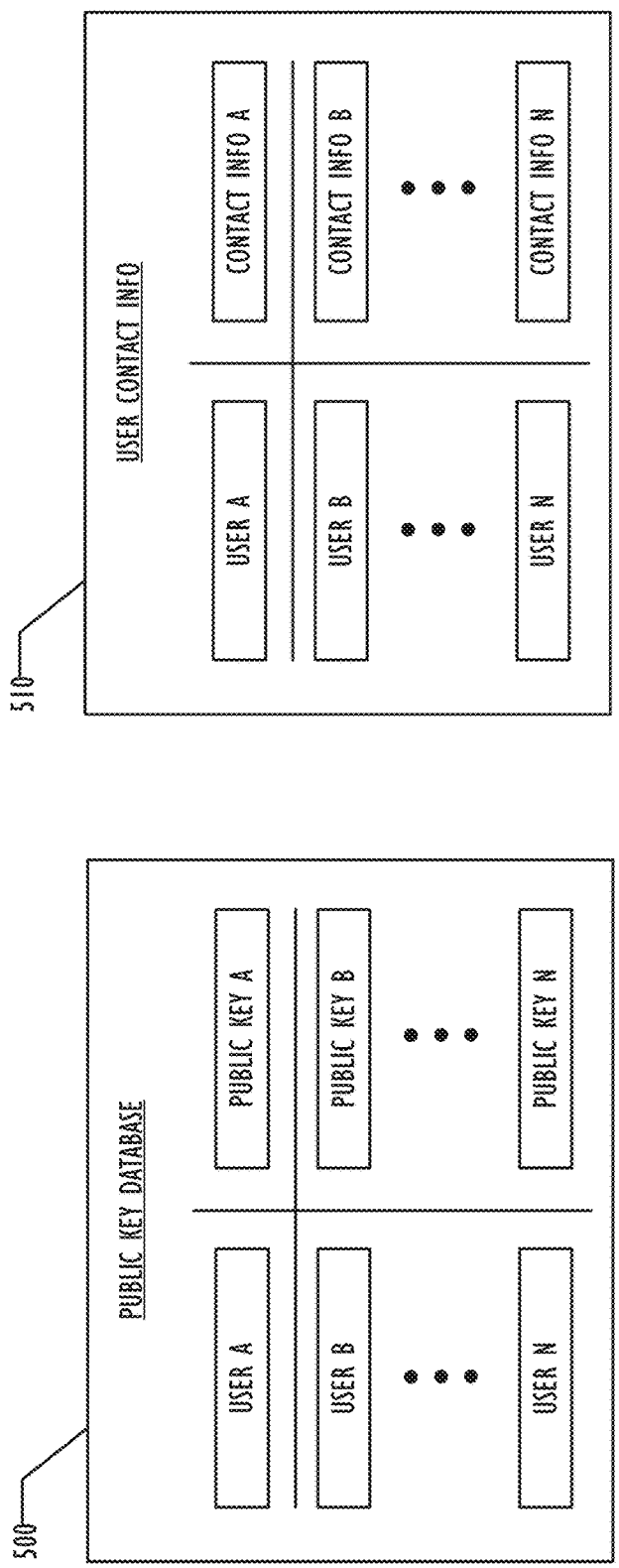
FIG. 5 shows an example of customized privacy and access permission setting setting using encryption keys, according to one or more disclosed embodiments.

FIG. 5 shows an example of a customized privacy and access permission settings system using encryption keys, according to one or more disclosed embodiments. Public key database 500 comprises an association of user profiles and public keys associated with those users. User A in public key database 500 may refer to the sender in the scenario described above with reference to FIG. 4, whereas Users B-N may refer to potential desired recipients in the scenario described above with reference to FIG. 4. User contact info database 510 comprises an association of user profiles and contact information associated with those users. Again, user A in contact info database 510 may refer to the sender in the scenario described above with reference to FIG. 4, whereas Users B-N may refer to potential desired recipients in the scenario described above with reference to FIG. 4.

According to some embodiments of the customized privacy and access permission settings system described herein, users may set the recipients of a particular document or message to have a status of: "Read only," "Read and Share," or neither. The user may also set a file to be re-sharable to the public (e.g., universally sharable) or to a particular group of recipients.

According to one embodiment of a method of utilizing user-defined, content-agnostic privacy and access permission settings for document sharing, first, the user, e.g., User A as shown in FIG. 5, selects a message or document that he or she desires to send. Next, the user chooses the user or users that are his or her desired recipients for the selected message or document, e.g., User B. Next, the user contact information, e.g., "Contact Info B" in the contact info database 510 of FIG. 5, is matched to the user or users that are the desired recipients of the document. Next, each desired recipient user's information is found in the public encryption key database, e.g., "Public Key B" in public key database 500 of FIG. 5. Finally, the located public key, e.g., "Public Key B," is used to encrypt the content of the message or document that is to be sent, and the encrypted message or document is sent to each of the desired recipients, who may then use their private keys to decrypt the message or document.

"Hidden Encryption" Techniques Leveraging Existing Message Object Data Structures As mentioned above, an additional feature that users of such a communications system may desire is the ability to manipulate outgoing message objects of pre-existing formats, so as to "hide" the encrypted document and/or message content within one or more portions of the message object that are not displayed in existing message viewer applications, e.g., metadata fields or unused headers. As such, only authorized message viewing applications may know where to look for (and have the necessary keys to decrypt) such "secret," i.e., hidden (and/or encrypted), content.

Figure 6:
FIG. 6 shows an example of the use of applicable header properties in an email message, according to one or more disclosed embodiments.

Turning now to FIG. 6, an example 600 of the use applicable header properties in an email message is shown, according to one or more disclosed embodiments. In some embodiments, such as the embodiments that will be discussed herein, the header properties utilized may be "X-Headers." X-Headers are simply optional headers that may be added into an email message object in addition to the typical headers 605, such as "To:," "From:," "BCC:," "Subject:," etc.

As shown in FIG. 6, the field A-Data' 610 is an exemplary "X-Header" used to hold some data value (SOMEDATA123') that may be used for any number of purposes, such as tracking, categorization, data mining, etc. Likewise, the exemplary field 'X-Thread-Track' 615 is an exemplary "X-Header" used to hold another data value (968423684') that may be used, e.g., to link email messages together by "thread" for archival or other purposes. Importantly, these exemplary X-Header fields already exist in email message formats, such as MIME, but there are no strict rules (or restrictions) for what such fields must be used for—or if they even must be used at all. Further, these exemplary X-Headers would not be the type of data fields that would be traditionally displayed in any user-viewable fashion in existing message viewer applications (e.g., webmail clients). By contrast, the other fields in the email message object, e.g., the Subject ("New Financial Reports") and the body text of the email, "Check out the new financial reports. This is good news!—Joe" would both traditionally be displayed in a user-viewable fashion in existing message viewer applications.

Even though the exemplary X-Header fields described above would not traditionally be displayed to a user in an existing message viewer applications, the data held in those fields would be sent to the intended recipient and then stored, archived, and/or exported, etc. using the infrastructure of the recipient's existing communication channel (e.g., the recipient's webmail provider's servers), such that the information contained in such X-Headers would always be retrievable, just as the body text and other displayed portions of such messages would always be retrievable from the existing communication channel's storage infrastructure (assuming that the user doesn't irreversibly delete such message, of course). As described in greater detail below, the persistent storage of these non-displayed, i.e., "hidden" fields in existing communication channels' storage infrastructures may be leveraged by intelligently-programmed authorized message viewing applications to provide the "hidden and encrypted" secret message content functionality disclosed herein.

Figure 7:
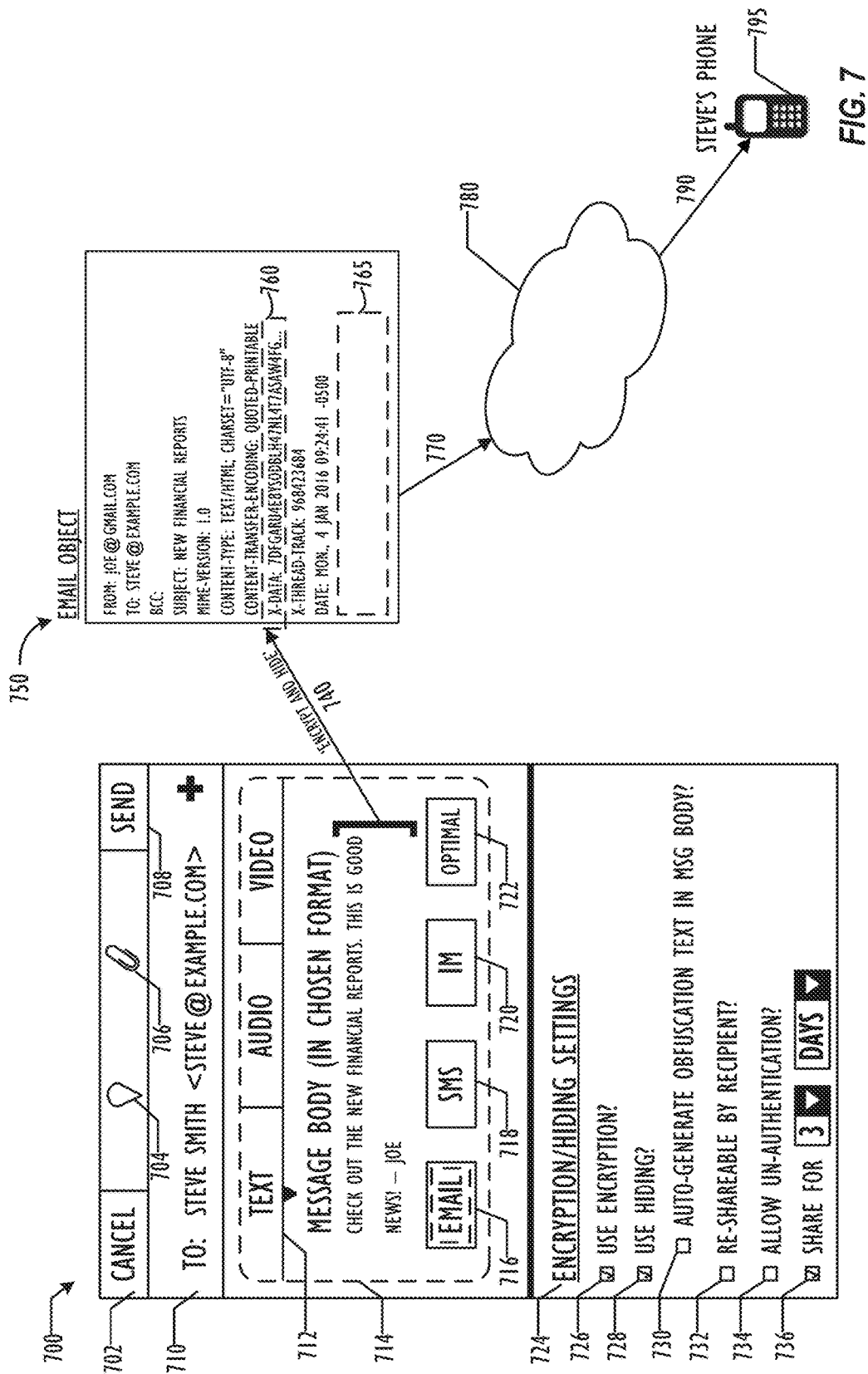
FIG. 7 shows an example of an interface for setting hiding and encryption options for an outgoing message object, according to one or more disclosed embodiments.

Turning now to FIG. 7, an example of an interface 700 for setting hiding and encryption options for an outgoing message object capable of being sent in multiple formats and delivered via multiple delivery protocols is shown, according to one or more disclosed embodiments. The top row of interface 700 in the example of FIG. 7 presents the user with several options related to the composition of a given communication. For instance, icon 704 may provide the user with the ability to geo-tag his or her location onto the message being sent, and icon 706 may be used to attach one or more file attachments to the message being composed, button 702 may be used to cancel the message being composed, and button 708 may be used to send off the message to the one or more recipients specified in the "To:" field 710. In this case, a single user, Steve Smith, having the email address <steve@example.com> is the only listed recipient. Clicking the plus-sign may allow the user to add additional recipients for the message object being composed.

Message box 714 may be used by the user to enter his or her message (in this case, the message is again: "Check out the new financial reports. This is good news!—Joe") in any desired communications format or protocol that the system is capable of handling. For example, a text message may be entered by activating icon 712 and using an on-screen keyboard or the like. Alternately, an audio message or a video message may be recorded by activating the other icons across the top row of message box 714. Once the message has been composed in the desired format, the user may utilize the row of icons 716/718/720/722 across the bottom of message box 714 to select the desired delivery protocol for the outgoing communication. As shown in FIG. 7, those protocols may include, e.g., email, SMS/MMS/IM, or "Optimal." As may be understood, the selection of desired delivery protocol may necessitate a conversion of the format of the composed message. For example, if a message is entered in audio format, but is to be sent out in a text format, such as via the SMS protocol, the audio from the message would be digitized, analyzed, and converted to text format before sending via SMS (i.e., a speech-to-text conversion). Likewise, if a message is entered in textual format, but is to be sent in voice format, the text from the message will need to be run through a text-to-speech conversion program so that an audio recording of the entered text may be sent to the desired recipients in the selected voice format via the appropriate protocol, e.g., via an email message.

The selection of the "Optimal" delivery option may have several possible implementations. The selection of output message format and protocol may be based on, e.g., the format of the incoming communication, the preferred format or protocol of the recipient and/or sender of the communication (e.g., if the recipient is an 'on-network' user who has set up a user profile specifying preferred communications formats and/or protocols), an optimal format or protocol for a given communication session/message (e.g., if the recipient is in an area with a poor service signal, lower bit-rate communication formats, such as text, may be favored over higher bit-rate communications formats, such as video or voice), and/or economic considerations of format/protocol choice to the recipient and/or sender (e.g., if SMS messages would charge the recipient an additional fee from his or her provider, other protocols, such as email, may be chosen instead).

Other considerations may also go into the determination of an optimal delivery option, such as analysis of recent communication volume, analysis of past communication patterns with a particular recipient, analysis of recipient calendar entries, and/or geo-position analysis. Other embodiments of the system may employ a 'content-based' determination of delivery format and/or protocol. For example, if an outgoing message is recorded as a video message, SMS may be de-prioritized as a sending protocol, given that text is not an ideal protocol for transmitting video content. Further, natural language processing (NLP) techniques may be employed to determine the overall nature of the message (e.g., a condolence note) and, thereby, assess an appropriate delivery format and/or protocol. For example, the system may determine that a condolence note should not be sent via SMS, but rather translated into email or converted into a voice message.

The bottom portion of exemplary interface 700 in the example of FIG. 7 presents the user with several access permission setting options, e.g., options related to the encryption and/or hiding settings 724 for the content of the message object that is being composed. For example, as a threshold inquiry, the user may select whether or not they want to send the message object that is being composed in encrypted fashion (Option 726). Further, the interface may present an option allowing the user to select whether the message "hides" the content (Option 728). As discussed above, depending on the existing message object data structure, the message body content (encrypted or otherwise) may be hidden in one or more portions of the message object that are not displayed in existing message viewer applications, such as hidden metadata fields or unused headers. Next, the interface may present an option allowing the system to auto-generate obfuscation text in the message body in place of the actual message body content that has been hidden from the user-viewable portions of the message (Option 730). For example, in the instant example, where the actual message body content is the message: "Check out the new financial reports. This is good news!—Joe," the auto-generated obfuscation text inserted into the message body may be: "Having a good day? Let's get together after work." Thus, a recipient of this message would simply see the auto-generated obfuscation text of "Having a good day? Let's get together after work." unless they were an intended recipient viewing the message in an authorized message viewing application, which would know where to find and how to decrypt the actual message content of: "Check out the new financial reports. This is good news!—Joe." In this way, an unintended viewer or recipient may not even know that they are missing out on the actual content of the message. In other embodiments, the system may generate one or more obfuscation media objects (e.g., images, video, audio, etc.) to include in the 'message body' field of the message object, rather than obfuscation text. Thus, the message body of the exemplary message above may be replaced with a picture of a sunset, rather than the obfuscating text-based message of: "Having a good day? Let's get together after work." If Option 730 is left unselected, then the message body may simply be left "blank." Other options presented by interface 700 may include the ability to allow the message to be re-shareable by the recipient (Option 732), the ability to allow the message to be 'un-authenticated,' i.e., by removing the authentication for a specific message viewing application (Option 734), and/or the ability to only share the message content with the intended recipients for a time-limited amount of time (e.g., a certain number of minutes, hours, days, weeks, years, etc.) (Option 736).

Assuming that exemplary Options 726 and 728 (i.e., the Options to "Encrypt and Hide) are selected by the user for the composition of this particular message, when the user selects the Send button 708, the system may format the message object content into the appropriate content format. In this case, "Email" option 716 has been selected, so the system will create and fill-in the necessary fields of Email Object 750, e.g., "From:," "To:," "Subject:," etc. with the information that the user has input into interface 700. Additionally, as shown by element 740, the system will encrypt the message body content and 'hide' it in one or more format-specific portions of the created outgoing message object 750, e.g., in an X-Header field such as the aforementioned exemplary "X-Data" field 760. Because an encrypted version of the message body content is stored in non-visible portion 760 of the outgoing email message object 750, the actual message body portion 765 of the outgoing email message object may be left blank. As may now be understood, while outgoing email message object 750 carries the encrypted version of the message body content to the recipient, it does not carry it in any user-viewable field. Of course, different message format data structures and delivery protocols may choose different portions of the outgoing message object to 'hide' the encrypted content, and the use of X-Headers in MIME email objects is merely exemplary. As mentioned above, if Option 730 is selected, the actual message body portion 765 of the outgoing email message object may instead contain auto-generated obfuscation text rather than being left blank.

As shown by element 770, the created outgoing message object 750 may then be sent over a network 780 and delivered (element 790) to the one or more intended message recipients. In this example, the user Steve Smith receives the message object 750 carrying the hidden encrypted message content at his device, "Steve's Phone" 795. The recipient's device may be capable of executing both authorized (i.e., 'on-system') client viewer applications (i.e., those applications capable of locating and decrypting the hidden and encrypted content) and unauthorized (i.e., 'off-system') client viewer application (i.e., traditional and existing message viewer applications, such as webmail clients, that do not have the knowledge of where to look for the hidden data or the decryption keys necessary to decrypt such data, even if it could locate it).

Figure 8:
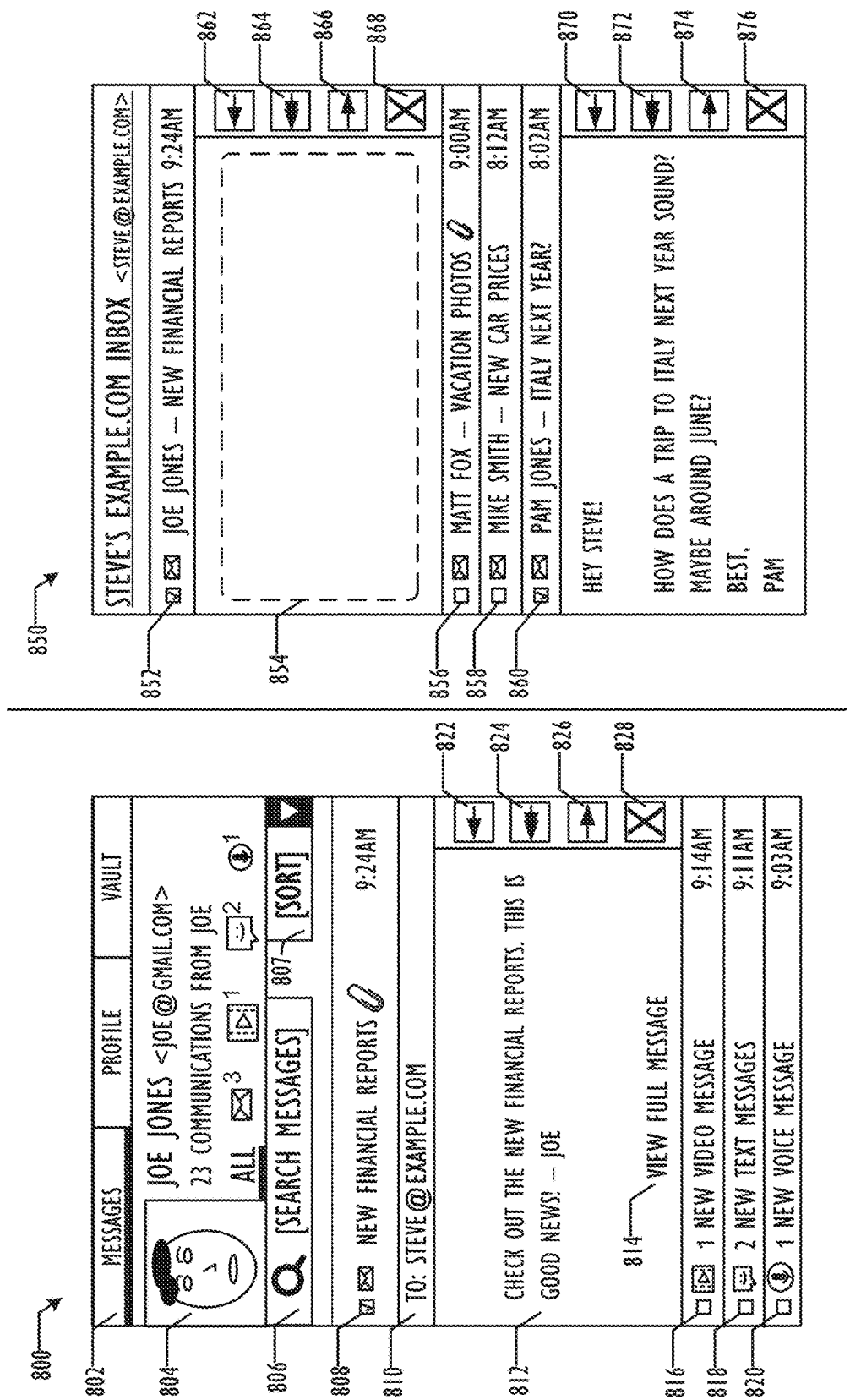
FIG. 8 shows examples of an authorized (i.e., 'on-system') client viewer application and an unauthorized (i.e., 'off-system') client viewer application each attempting to display the same message object, according to one or more disclosed embodiments.

Turning now to FIG. 8, examples of an authorized (i.e., 'on-system') client viewer application 800 and an unauthorized (i.e., 'off-system') client viewer application 850, each attempting to display the same message object 750 intended for recipient Steve Smith <steve@example.com> are shown, according to one or more disclosed embodiments.

Looking first at authorized (i.e., 'on-system') client viewer application 800, the interface comprises a row of tabs across the top, including "Messages" tab 802, which is the only tab relevant to the discussion herein. Below the row of tabs is a user profile picture 804 for the particular user whose communications are currently being displayed. In this example, the user whose communications are currently being displayed is "Joe Jones," who has an email address of Joe@gmail.com. As is shown, intended recipient Steve Smith has received 23 total communications from Joe Jones, which are grouped here by format and sorted chronologically. Although a user-centric-style inbox feed is shown in application 800, i.e., an inbox feed showing all of the messages sent from a particular user to the inbox feed owner, i.e., Steve Smith in this example, this style of inbox is used here only for illustrative purposes, and any desired inbox feed style may be employed in such an authorized message viewing application. Application 800 may also present users with other familiar options such as searching 806 and sorting 807 of messages.

The interface of application 800 also includes a preview pane 812 for displaying exemplary multi-protocol, multi-format messages to and from a particular user. As is shown in FIG. 8, the message associated with checkbox 808, i.e., "New Financial Reports," which corresponds to message object 750, has been opened to provide a more in-depth preview of the associated email text. According to some embodiments, the recipients 810 are listed out above the body of the email, and a link 814 may be activated that causes the application to retrieve the full email message from either the system's sync server or third party email servers (e.g., including the rest of the encrypted message body text and/or any document attachments, such as the attachments indicated by the 'paperclip' icon next to the message associated with checkbox 808 in application 800). The interface 800 may also provide a number of preview quick action buttons to be performed on the message that is being previewed, e.g., reply 822, reply all 824, forward 826, delete 828, etc. Because a user-centric inbox feed is shown in application 800, the interface may also include additional rows containing messages from user Joe Jones 804 to Steve Smith that were sent using different delivery protocols, e.g., video (MMS) messages 816, text (SMS) messages 818, and voicemail messages 820.

Because client viewer application 800 is an authorized (i.e., 'on-system') client viewer application, and because Steve Smith was the intended recipient of message object 750 from Joe Jones (which was constructed in FIG. 7), application 800 knows where to look in message object 750 (e.g., in the X-Data X-Header 760 in this example) for the encrypted message body content and also hold the correct decryption key to decrypt the message body content. Thus, application 800 may seamlessly locate and decrypt the message body content and display it in preview pane 812, giving the user the desired and intended user experience for retrieving and viewing the message object 750.

According to some embodiments, each time user Steve Smith checked his inbox feed for message object 750 from Joe Jonas, the application 800 may check to ensure that Steve Smith is still an authorized user for the message object 750. If the user is still authorized, then the message object may be opened or re-downloaded with updated credentials, instructions, etc. If user is no longer authorized, then the file may either be removed from the client's inbox feed or updated with a "new" version of the file, e.g., which may have been re-encrypted with a new public/private key pair. According to some embodiments, the only check performed by the system may be to determine if there have been and updates to the message object's content (e.g., assuming that any change to the message's permissions would result in the generation of a new encryption anyway). Therefore, according to such embodiments, the only check performed by the system would be to determine whether the recipient requesting the file should be provided with a central key by the server (e.g., in an embodiment that uses shared server-side keys rather than client-side keys).

For example, as mentioned with reference to FIG. 7, if Option 736 were selected by the sender Joe Jones, the ability of recipient Steve Smith to decrypt message object 750 may be time-limited, that is, his decryption key may expire after a predefined period of time, e.g., 3 days. Thus, unless Steve Smith had taken a "screenshot" (or took some other action to circumvent the encryption protections) when he did have access to the message, he will no longer be able to view the message content once his access time period has expired. Likewise, if Option 732 were selected by the sender Joe Jones, the ability of recipient Steve Smith to forward message object 750 with the necessary decryption keys would be disabled. Instead, Steve Smith would only be able to send the message having the hidden and encrypted text, but the recipients would not have the ability to decrypt the message content—even if viewing the message in an authorized message viewing application. Depending on the overall access permission settings used in a given implementation, the local recipient client intent on forwarding the message may be required to decrypt the message and re-encrypt the message with a new shared public key for each new recipient(s).

Finally, if Option 734 were selected by the sender Joe Jones, it would give him the ability to remove the authentication for a specific message viewing application, e.g., with respect to message object 750. According to some embodiments, message objects may be unauthenticated at the individual recipient-level, e.g., allowing a sender to 'ex-post-facto' remove a particular recipient's ability to view the actual content of message object 750 in a previously authenticated message viewing application.

Looking now at unauthorized (i.e., 'off-system') client viewer application 850, the interface comprises rows of messages received by Steve Smith in his "Example.com" email address inbox. "Example.com" is meant to represent any of a number of existing message viewer applications, such as webmail client applications and the like. The interface of application 850 also includes a preview pane 854 for displaying messages to and from Steve Smith using his @Example.com email address. As is shown in FIG. 8, the message associated with checkbox 852, i.e., "New Financial Reports," which corresponds to message object 750, has been opened to provide a more in-depth preview of the associated email text. However, unlike authorized (i.e., 'on-system') client viewer application 800, in unauthorized (i.e., 'off-system') client viewer application 850, the message body, as shown in preview pane 854 is blank, both because Example.com's webmail client application does not know to look into the X-Data X-Header 760 to find the actual message body content and, even if it did, it would not have access to the decryption keys necessary to decrypt the encrypted content hidden in the X-Data X-Header field. In other words, all the unauthorized (i.e., 'off-system') client viewer application 850 knows to do is display the message body portion 765 of message object 750, which, in this case, is blank. As mentioned above, preview pane 854 may alternately be filled with auto-generated obfuscation text (rather than being left blank), e.g., if the sender had selected Option 730 in FIG. 7. Such obfuscation text may have nothing to do with the actual body content of the message object, e.g., "Having a good day? Let's get together after work." Note also that application 850 cannot interpret that there are hidden and encrypted file-level attachments to message 852 (whereas application 850 was able to identify file-level attachments to equivalent message 808 because it knew where to look for—and how to decrypt and parse—the hidden data in the message object). For other messages that are not "hidden and encrypted," e.g., message 856, application 850 is able to detect file-level attachments because they are not encrypted and they are stored in the normal and expected part of the email message data structure.

The interface 850 may also provide a number of preview quick action buttons to be performed on the message that is being previewed, e.g., reply 862/870, reply all 864/872, forward 886/874, delete 868/876, etc. The inbox feed shown in application 850 includes additional rows containing messages from other users to and from Steve Smith (e.g., messages 856/858/860) that are not "hidden and encrypted." These messages, in addition to message 852 (which is not viewable in application 850), may each be safely archived, recovered, etc. using Example.com's existing infrastructure, without giving Example.com the ability to crawl the content of the user's messages that have been "hidden and encrypted."

The systems described herein may provide an added benefit over other prior art "secure messaging" systems, such as those commonly used by banking companies, credit card companies, or medical providers, and that like, which send links to customers in email messages that direct the recipient out to the company's proprietary "Message Centers" that are only accessible by logging in to the company's secure website. In particular, if the company were to have their servers go down, go out of business, lose their data, be hacked, etc., all of the user's message history could be lost or otherwise comprised. By contrast, the systems disclosed herein proved a system that allows the user's data to live on securely (and in a hidden fashion) long beyond the end of the user's relationship with the particular banking/financial/medical company may come to an end.

Figure 9A:
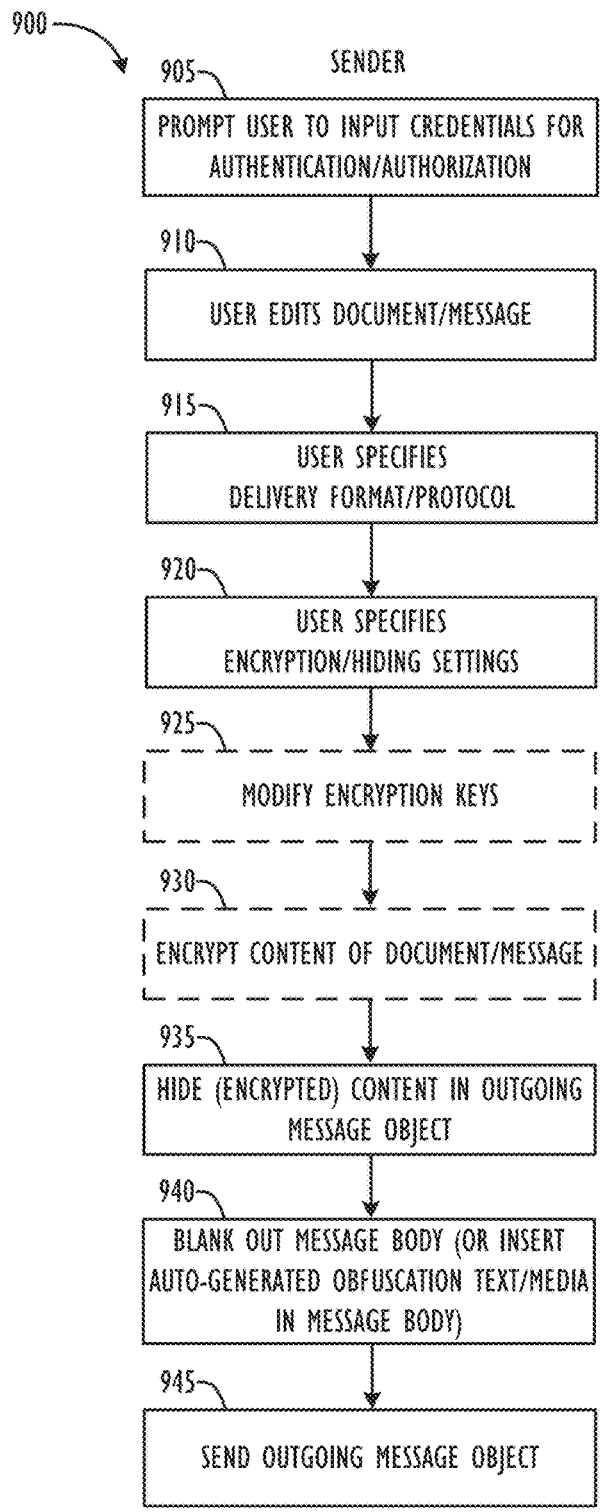
FIG. 9A is a flowchart showing a method for utilizing hidden encryption techniques from the sender's perspective, according to one or more disclosed embodiments.

Turning now to FIG. 9A, a flowchart 900 showing a method for utilizing hidden encryption techniques is shown from the sender's perspective, according to one or more disclosed embodiments. First, the authorized message viewing application prompts the sender to input his or her credentials for authentication (Step 905). Next, the sender opens the document and edits the document, e.g., by typing the content of a message and selecting particular recipients or groups of recipients to share access to the document with (Step 910). Next, the user may specify what delivery formats/protocols to use to send the message to the particular recipients or groups of recipients (Step 915).

By knowing what format(s) the message will be sent in, the process 900 may know what portion(s) of the message object's data structure to 'hide' the encrypted content in. Next, the user may specify one or more encryption/hiding access permission settings, such as exemplary settings 724 discussed with reference to FIG. 7 (Step 920). Next, assuming encryption is desired, the process 900 may modify the encryption keys in accordance with the encryption/hiding settings specified in Step 920, so as to enforce the user's desired access and sharing permissions (Step 925). According to some embodiments, when a group of recipients is specified for the outgoing message, group private key exchanges may be employed to implement the sender's desired encryption/hiding settings as to each recipient. These keys and encryption settings may also be changed, updated, upgraded, etc., over time, such that permissions may be granted or revoked to individual recipients of the same message over time. In some embodiments, the system may also create multiple versions of the message based on the type of encryption used for a given recipient or group of recipients.

Next, the body content of the message may be encrypted using the encryption keys (Step 930) and then hidden in the outgoing message object at the appropriate portion(s) for the type of message object being sent (Step 935). For added obfuscation, the actual viewable message body portion of the message object may then be blanked out (or, alternately, filled with auto-generated obfuscation text and/or media objects, e.g., text and/or media objects that are unrelated to the actual message content) (Step 940). Finally, the process 900 may send the "hidden and encrypted" outgoing message object to the desired recipient(s) (Step 945).

Steps 925 and 930 are shown in dashed-line boxes in FIG. 9A to indicate that, according to some embodiments, encryption of the message object content may not be necessary or desired, and is thus comprise optional steps in the process 900. For example, in some embodiments, the hidden content concept may be used without encryption. For example, the system may generate a unique message (perhaps even with a unique message ID tracked in the system) with content unrelated to the content of the actual message object content being sent and embed the generated unique message directly into the message body (or, alternately, into the aforementioned applicable header properties, such as X-Headers in an email message) and save the original (i.e., true) message content inside the system server. The generated unique message may be a message comprising, e.g.: newly-generated obfuscation text, random text (i.e., garbled text), or even a different but actual message sent to or from the sender (e.g., the unique message could be a legitimate message that the user sent years ago, such that it would appear to be an "actual" or "legitimate" contemporaneous message to the unknowing observer that is not authenticated to view the actual "secret" content of the message). In other words, according to such embodiments that do not employ encryption, the message doesn't have to be client-side encrypted to protect its content from being viewed by unintended recipients, but rather, the message may be permission access controlled, such that the receiving client needs only to be correctly authenticated in order to receive the true message object content (as opposed to the generated unique message). Such embodiments may be beneficial, e.g., in systems where true encryption security isn't as important as easy sharing, recovery, and simple central key access management.

Figure 9B:
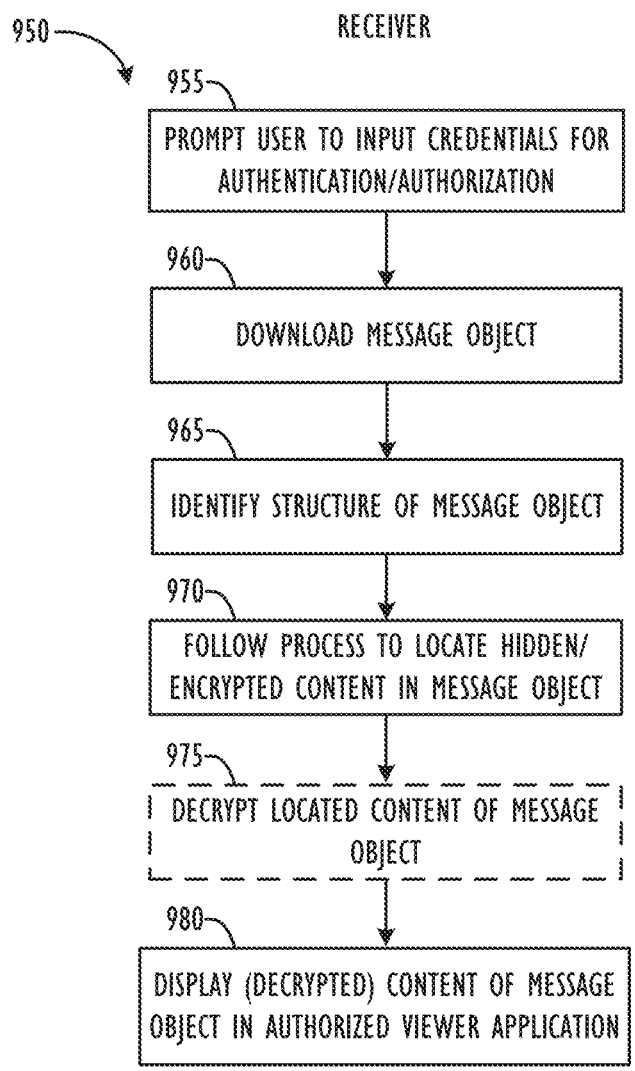
FIG. 9B is a flowchart showing a method for utilizing hidden encryption techniques from the receiver's perspective, according to one or more disclosed embodiments.

Turning now to FIG. 9B, a flowchart 950 showing a method for utilizing hidden encryption techniques is shown from the receiver's perspective, according to one or more disclosed embodiments. First, the authorized message viewing application prompts the receiver to input his or her credentials for authentication (Step 955). Next, the receiver directs the authorized message viewing application to download the message object (Step 960). Next, the authorized message viewing application identifies the structure of the message object (Step 965). By knowing what structure/format the message was sent in, the process 950 may know what process to follow to locate the portion(s) of the message object's data structure where the encrypted content has been hidden (Step 970). Next, process 950 may decrypt the located hidden and encrypted content using the appropriate decryption key(s) (Step 975). Finally, the process 950 may display the decrypted content of the message object in a seamless fashion in the authorized message viewing application, while enforcing all the sender's desired encryption/hiding settings for the message (Step 980).

EXAMPLES

The following examples pertain to further embodiments.

Example 1 is a non-transitory computer readable medium that comprises computer executable instructions stored thereon to cause one or more processing units to: receive first content corresponding to a document or message; determine a first message object format for the first content, the message object format having a first data structure comprising a plurality of portions, wherein one of the plurality of portions comprises a message body field; generate a first message object, the first message object having the determined first message object format; receive a first access permission setting for the first message object, wherein the first access permission setting comprises an encryption setting; receive a second access permission setting for the first message object, wherein the second access permission setting comprises an hiding setting; receive an indication of a first recipient for the first message object; generate a first encryption key for the first content based, at least in part, on the first access permission setting and the indicated first recipient of the first portion; encrypt the first content using the generated first encryption key for the first content; determine a first one or more portions of the first data structure of the first message object, wherein the determination of the first one or more portions is based, at least in part, on the second access permission setting and the first message object format, and wherein the determined first one or more portions do not comprise a message body field; store the encrypted first content in the determined first one or more portions of the first data structure of the first message object; determine a first delivery protocol for the first message object; and transmit the first message object to the first recipient using the determined first delivery protocol.

Example 2 includes the subject matter of example 1, wherein the computer executable instructions further cause the one or more processing units to: generate obfuscation text; and store the generated obfuscation text in the message body field of the first data structure of the first message object.

Example 3 includes the subject matter of example 1, wherein the computer executable instructions further cause the one or more processing units to: generate one or more obfuscation media objects; and store the generated one or more obfuscation media objects in the message body field of the first data structure of the first message object.

Example 4 includes the subject matter of example 1, wherein first message object format is a Multipurpose Internet Mail Extensions (MIME) format.

Example 5 includes the subject matter of example 4, wherein the at least one of the determined first one or more portions of the first data structure of the first message comprises an X-Header field.

Example 6 includes the subject matter of example 1, wherein no information is stored in the message body field of the first data structure of the first message object.

Example 7 includes the subject matter of example 1, wherein the first access permission setting comprises an indication that the first recipient may read the first message object but may not share the first message object.

Example 8 includes the subject matter of example 1, wherein the first access permission setting comprises an indication that the first recipient may only read the first message object for a predefined period of time.

Example 9 includes the subject matter of example 1, wherein the first content is configured to be encrypted such that it may only be decrypted in an authorized message viewing application.

Example 10 includes the subject matter of example 1, wherein the computer executable instructions further cause the one or more processing units to: generate a second encryption key for the first content based, at least in part, on the first access permission setting and the indicated first recipient of the first portion; generate an encrypted second content by encrypting the first content using the generated second encryption key; and store the encrypted second content in the determined first one or more portions of the first data structure of the first message object.

Example 11 is a system comprising: a memory; and one or more processing units, communicatively coupled to the memory, wherein the memory stores instructions to configure the one or more processing units to: receive first content corresponding to a document or message; determine a first message object format for the first content, the message object format having a first data structure comprising a plurality of portions, wherein one of the plurality of portions comprises a message body field; generate a first message object, the first message object having the determined first message object format; receive a first access permission setting for the first message object, wherein the first access permission setting comprises an hiding setting; receive an indication of a first recipient for the first message object; determine a first one or more portions of the first data structure of the first message object, wherein the determination of the first one or more portions is based, at least in part, on the first access permission setting and the first message object format, and wherein the determined first one or more portions do not comprise a message body field; store the first content in the determined first one or more portions of the first data structure of the first message object; determine a first delivery protocol for the first message object; and transmit the first message object to the first recipient using the determined first delivery protocol.

Example 12 includes the subject matter of example 11, wherein the instructions are further configured to cause the one or more processing units to: generate obfuscation text; and store the generated obfuscation text in the message body field of the first data structure of the first message object.

Example 13 includes the subject matter of example 11, wherein the instructions are further configured to cause the one or more processing units to: generate one or more obfuscation media objects; and store the generated one or more obfuscation media objects in the message body field of the first data structure of the first message object.

Example 14 includes the subject matter of example 11, wherein first message object format is a Multipurpose Internet Mail Extensions (MIME) format.

Example 15 includes the subject matter of example 14, wherein the at least one of the determined first one or more portions of the first data structure of the first message comprises an X-Header field.

Example 16 includes the subject matter of example 11, wherein no information is stored in the message body field of the first data structure of the first message object.

Example 17 includes the subject matter of example 11, wherein the first access permission setting comprises an indication that the first recipient may read the first message object but may not share the first message object.

Example 18 includes the subject matter of example 11, wherein the first access permission setting comprises an indication that the first recipient may only read the first message object for a predefined period of time.

Example 19 includes the subject matter of example 11, wherein the first content is configured such that it may only be viewed in an authorized message viewing application.

Example 20 includes the subject matter of example 11, wherein the instructions are further configured to cause the one or more processing units to: generate a unique message body; and store the generated unique message body in the message body field of the first data structure of the first message object.

Example 21 is a computer-implemented method, comprising: receiving first content corresponding to a document or message; determining a first message object format for the first content, the message object format having a first data structure comprising a plurality of portions, wherein one of the plurality of portions comprises a message body field; generating a first message object, the first message object having the determined first message object format; receiving a first access permission setting for the first message object, wherein the first access permission setting comprises an encryption setting; receiving a second access permission setting for the first message object, wherein the second access permission setting comprises an hiding setting; receiving an indication of a first recipient for the first message object; generating a first encryption key for the first content based, at least in part, on the first access permission setting and the indicated first recipient of the first portion; encrypting the first content using the generated first encryption key for the first content; determining a first one or more portions of the first data structure of the first message object, wherein the determination of the first one or more portions is based, at least in part, on the second access permission setting and the first message object format, and wherein the determined first one or more portions do not comprise a message body field; storing the encrypted first content in the determined first one or more portions of the first data structure of the first message object; determining a first delivery protocol for the first message object; and transmitting the first message object to the first recipient using the determined first delivery protocol.

Example 22 includes the subject matter of example 21, further comprising: generating obfuscation text; and storing the generated obfuscation text in the message body field of the first data structure of the first message object.

Example 23 includes the subject matter of example 21, further comprising: generating one or more obfuscation media objects; and storing the generated one or more obfuscation media objects in the message body field of the first data structure of the first message object.

Example 24 includes the subject matter of example 21, wherein first message object format is a Multipurpose Internet Mail Extensions (MIME) format.

Example 25 includes the subject matter of example 24, wherein the at least one of the determined first one or more portions of the first data structure of the first message comprises an X-Header field.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer executable instructions stored thereon to cause one or more processing units to:
   receive first content corresponding to a document or message;
   determine a first message object format for the first content, the first message object format having a first data structure comprising a plurality of portions, wherein one of the plurality of portions comprises a message body field;
   generate a first message object, the first message object having the determined first message object format;

receive a first access permission setting for the first message object, wherein the first access permission setting comprises an encryption setting;
receive a second access permission setting for the first message object, wherein the second access permission setting comprises a hiding setting;
receive an indication of a first recipient for the first message object;
generate a first encryption key for the first content based, at least in part, on the first access permission setting and the indicated first recipient of the first message object;
encrypt the first content using the generated first encryption key for the first content;
determine a first one or more portions of the first data structure of the first message object, wherein the determination of the first one or more portions is based, at least in part, on the second access permission setting and the first message object format, and wherein the determined first one or more portions do not comprise the message body field;
store the encrypted first content in the determined first one or more portions of the first data structure of the first message object;
determine a first delivery protocol for the first message object;
generate obfuscation text;
store the generated obfuscation text in the message body field of the first data structure of the first message object; and
transmit the first message object to the first recipient using the determined first delivery protocol.

2. The non-transitory computer readable medium of claim 1, wherein the computer executable instructions further cause the one or more processing units to:
generate one or more obfuscation media objects; and
store the generated one or more obfuscation media objects in the message body field of the first data structure of the first message object.

3. The non-transitory computer readable medium of claim 1, wherein the first message object format is a Multipurpose Internet Mail Extensions (MIME) format.

4. The non-transitory computer readable medium of claim 3, wherein the at least one of the determined first one or more portions of the first data structure of the first message comprises an X-Header field.

5. The non-transitory computer readable medium of claim 1, wherein the first access permission setting comprises an indication that the first recipient may read the first message object but may not share the first message object.

6. The non-transitory computer readable medium of claim 1, wherein the first access permission setting comprises an indication that the first recipient may only read the first message object for a predefined period of time.

7. The non-transitory computer readable medium of claim 1, wherein the first content is configured to be encrypted such that it may only be decrypted in an authorized message viewing application.

8. The non-transitory computer readable medium of claim 1, wherein the computer executable instructions further cause the one or more processing units to:
generate a second encryption key for the first content based, at least in part, on the first access permission setting and the indicated first recipient of the first portion;
generate an encrypted second content by encrypting the first content using the generated second encryption key; and
store the encrypted second content in the determined first one or more portions of the first data structure of the first message object.

9. A system, comprising:
a memory; and
one or more hardware processing units, communicatively coupled to the memory, wherein the memory stores instructions to configure the one or more processing units to:
receive first content corresponding to a document or message;
determine a first message object format for the first content, the first message object format having a first data structure comprising a plurality of portions, wherein one of the plurality of portions comprises a message body field;
generate a first message object, the first message object having the determined first message object format;
receive a first access permission setting for the first message object, wherein the first access permission setting comprises a hiding setting;
receive an indication of a first recipient for the first message object;
determine a first one or more portions of the first data structure of the first message object, wherein the determination of the first one or more portions is based, at least in part, on the first access permission setting and the first message object format, and wherein the determined first one or more portions do not comprise the message body field;
store the first content in the determined first one or more portions of the first data structure of the first message object;
determine a first delivery protocol for the first message object;
generate obfuscation text;
store the generated obfuscation text in the message body field of the first data structure of the first message object; and
transmit the first message object to the first recipient using the determined first delivery protocol.

10. The system of claim 9, wherein the instructions are further configured to cause the one or more processing units to:
generate one or more obfuscation media objects; and
store the generated one or more obfuscation media objects in the message body field of the first data structure of the first message object.

11. The system of claim 9, wherein the first message object format is a Multipurpose Internet Mail Extensions (MIME) format.

12. The system of claim 11, wherein the at least one of the determined first one or more portions of the first data structure of the first message comprises an X-Header field.

13. The system of claim 9, wherein the first access permission setting comprises an indication that the first recipient may read the first message object but may not share the first message object.

14. The system of claim 9, wherein the first access permission setting comprises an indication that the first recipient may only read the first message object for a predefined period of time.

15. The system of claim 9, wherein the first content is configured such that it may only be viewed in an authorized message viewing application.

16. The system of claim 9, wherein the instructions are further configured to cause the one or more processing units to:

generate a unique message body; and store the generated unique message body in the message body field of the first data structure of the first message object.

17. A computer-implemented method, comprising:

receiving first content corresponding to a document or message;

determining a first message object format for the first content, the first message object format having a first data structure comprising a plurality of portions, wherein one of the plurality of portions comprises a message body field;

generating a first message object, the first message object having the determined first message object format;

receiving a first access permission setting for the first message object, wherein the first access permission setting comprises an encryption setting;

receiving a second access permission setting for the first message object, wherein the second access permission setting comprises a hiding setting;

receiving an indication of a first recipient for the first message object;

generating a first encryption key for the first content based, at least in part, on the first access permission setting and the indicated first recipient of the first message object;

encrypting the first content using the generated first encryption key for the first content;

determining a first one or more portions of the first data structure of the first message object, wherein the determination of the first one or more portions is based, at least in part, on the second access permission setting and the first message object format, and wherein the determined first one or more portions do not comprise the message body field;

storing the encrypted first content in the determined first one or more portions of the first data structure of the first message object;

determining a first delivery protocol for the first message object;

generating obfuscation text;

storing the generated obfuscation text in the message body field of the first data structure of the first message object; and transmitting the first message object to the first recipient using the determined first delivery protocol.

18. The method of claim 17, further comprising:

generating one or more obfuscation media objects; and storing the generated one or more obfuscation media objects in the message body field of the first data structure of the first message object.

19. The method of claim 17, wherein the first message object format is a Multipurpose Internet Mail Extensions (MIME) format.

20. The method of claim 19, wherein the at least one of the determined first one or more portions of the first data structure of the first message comprises an X-Header field.

* * * * *